US006870156B2

(12) United States Patent
Räther

(10) Patent No.: US 6,870,156 B2
(45) Date of Patent: Mar. 22, 2005

(54) HIGH RESOLUTION DETECTION FOR TIME-OF-FLIGHT MASS SPECTROMETERS

(75) Inventor: Oliver Räther, Bremen (DE)

(73) Assignee: Bruker Daltonik, GmbH, Bremen (DE)

( * ) Notice: Subject to any disclaimer, the term of this patent is extended or adjusted under 35 U.S.C. 154(b) by 0 days.

(21) Appl. No.: 10/366,578

(22) Filed: Feb. 13, 2003

(65) Prior Publication Data

US 2003/0218129 A1 Nov. 27, 2003

(30) Foreign Application Priority Data

Feb. 14, 2002 (DE) ........................................ 102 06 173

(51) Int. Cl.[7] ................................................ B01D 59/04

(52) U.S. Cl. ....................... 250/287; 250/283; 250/288; 250/282

(58) Field of Search ................................ 250/287, 288, 250/282, 283

(56) References Cited

U.S. PATENT DOCUMENTS 4,490,806 A * 12/1984 Enke et al. ................. 708/445
4,970,390 A 11/1990 Szymczak
5,428,357 A * 6/1995 Haab et al. ................. 341/155
5,712,480 A * 1/1998 Mason ....................... 250/287
5,792,664 A * 8/1998 Chait et al. ................... 436/89
5,965,882 A * 10/1999 Megerle et al. ............. 250/287
5,981,946 A * 11/1999 Mason ....................... 250/287
6,229,142 B1 * 5/2001 Bateman et al. ............ 250/287
6,253,162 B1 6/2001 Jarman et al.
6,288,389 B1 9/2001 Franzen
6,646,252 B1 * 11/2003 Gonin ........................ 250/287

FOREIGN PATENT DOCUMENTS

GB 2 333 893 A 8/1999
GB 2 334 813 A 9/1999
WO WO 01/18846 A2 3/2001

* cited by examiner

*Primary Examiner*—John R. Lee
*Assistant Examiner*—Johnnie L Smith, II

(57) ABSTRACT

The invention covers a method for detecting ions in high resolution time-of-flight mass spectrometers which operate with secondary electron multiplier multichannel plates and in which many single spectra are acquired and added to produce a sum spectrum. The invention involves (a) using an analog digital converter (ADC) for converting electron currents from secondary electron multipliers, instead of a time-to-digital converter (TDC) which was previously used for highest possible signal resolution, (b) performing a separate rapid peak recognition procedure for the ion signals of each spectrum by a fast calculation method, thereby collecting flight time and intensity value pairs for the ion peaks, and (c) constructing a time-of-flight/intensity histogram, which is further processed as a composite time-of-flight spectrum. The invention retains the significantly higher measurement dynamics of an ADC and achieves the improved resolution capability of a TDC, but without showing the latter's known signal distortion due to dead times.

15 Claims, 2 Drawing Sheets

HIGH RESOLUTION DETECTION FOR TIME-OF-FLIGHT MASS SPECTROMETERS

FIELD OF THE INVENTION

The invention refers to a method for detecting ions in high resolution time-of-flight mass spectrometers which operate with secondary electron multiplier multichannel plates and in which many single spectra are acquired and added to produce a sum spectrum.

BACKGROUND OF THE INVENTION

Many time-of-flight mass spectrometers acquire separate time-of-flight spectra which contain the signals of only a few ions in each case in rapid succession and consequently produce individual spectra which are full of gaps. Thousands of these individual spectra, which are scanned at very high frequencies producing tens of thousands of spectra per second, are then immediately processed to form a sum spectrum for obtaining usable time-of-flight spectra with fairly well characterized signals for the ion species of different masses.

Mass spectra are calculated from these time-of-flight spectra. The purpose of this time-of-flight mass spectrometer is to determine the masses of the individual ion species as accurately as possible. Mass spectrometer developers are currently occupied with improving the mass accuracies which can be achieved from 30 ppm to 10 ppm or from 10 ppm to 5 ppm, depending on the spectrometer concerned, but the long-term aim is 3 ppm or even 2 ppm.

The term "ppm" (parts per million), which is used to describe the accuracy, is defined as the relative accuracy of the mass determination in millionth parts of the mass. The accuracy is established statistically and, under the tacit assumption that the measurement scatter conforms to a normal distribution, is characterized by the width parameter of the measurement value distribution, sigma. This width parameter is given by the distance between the point of inflection and the maximum of the Gaussian normal distribution curve. According to the definition, the following applies: if the mass determination is repeated many times over, then 68% of the values will lie within the double sigma interval stretching between the two sides (i.e. between the points of inflection), 95.7% will lie inside the quadruple sigma interval, 99.74% inside the sixfold sigma interval and 99.9936% inside the eightfold sigma interval of the normal distribution curve for the error scatter.

These types of mass spectrometers are used in particular in molecular biochemistry for determining the masses of the peptides produced by the tryptic digestion of a protein etc. By searching a protein database, the protein can be identified from the accurately determined masses of the peptides produced by the digestion, the quality of the identification depending on the accuracy of the mass determination. Knowledge of the accuracy is needed to set the mass tolerance for the search—if it is desired that none of the virtual digestion peptides of the database be lost during the search and ignored for the identification, four times the value of the accuracy achieved is entered (defined as the single sigma of the normal distribution), for example. For a mass-spectrometric accuracy of 10 ppm, therefore, a mass tolerance of 40 ppm is entered to include all the virtual digestion peptides for the identification with a certainty of 99.9936%. However, at the same time, other proteins with virtual digestion peptides which happen to have a similar mass may be found by the search, so the search is no longer unambiguous. Entering smaller mass tolerances can help, but again, digestion peptides may be excluded because the mass measurement is too inaccurate and therefore lead to a poor evaluation of the search. Consequently, the only way out is to use a mass spectrometer which can deliver a mass determination which is very accurate.

In another field of applications, the elementary composition of small molecules in the mass range up to several hundred atomic mass units has to be determined from the measured mass of the ions. Here, too, a very high accuracy is required.

TABLE 1

Error distribution widths 2 × sigma as a function of the mass and accuracy

| Accuracy [ppm]: | | 30 | 10 | 5 | 3 |
|---|---|---|---|---|---|
| Mass [u] | Time of flight [μs] | 2 × sigma [ns] | 2 × sigma [ns] | 2 × sigma [ns] | 2 × sigma [ns] |
| 100 | 7.07 | 0.106 | 0.035 | 0.018 | 0.011 |
| 200 | 10.00 | 0.150 | 0.050 | 0.025 | 0.015 |
| 500 | 15.81 | 0.237 | 0.079 | 0.040 | 0.024 |
| 1,000 | 22.36 | 0.335 | 0.112 | 0.056 | 0.034 |
| 2,000 | 31.62 | 0.474 | 0.158 | 0.079 | 0.047 |
| 5,000 | 50.00 | 0.750 | 0.250 | 0.125 | 0.075 |

The two-sided distribution widths 2×sigma of the errors in the time-of-flight determination which precedes the mass determination are shown in Table 1 for a time-of-flight mass spectrometer which needs a time-of-flight of 50 microseconds for ions of mass 5,000 unified atomic mass units. (The "unified atomic mass unit" is a non-coherent SI unit with the abbreviation "u", which is a legally stipulated mass unit in Germany. The US abbreviation is "amu"). The distribution widths 2×sigma correspond to the distance between the two points of inflection of the Gaussian normal distribution and are expressed in nanoseconds. For an accuracy of 5 ppm, the (averaged) time-of-flight of the ions of a mass of 1,000 atomic mass units must be determined accurately to 56 picoseconds (plus/minus 28 picoseconds). (The times of flight of the ions must be determined with a relative accuracy which is double that required for the relative mass accuracy in each case, since the masses are proportional to the squares of the times of flight.) These figures are not dependent on the length of the flight path of the apparatus—a shorter flight path requires a lower acceleration voltage for the ions.

TABLE 2

Mass peak widths as a function of mass and mass resolution

| Resolution: | | 5,000 | 10,000 | 20,000 | 40,000 |
|---|---|---|---|---|---|
| Mass [u] | Time of flight [μs] | Width [ns] | Width [ns] | Width [ns] | Width [ns] |
| 100 | 7.07 | 1.41 | 0.71 | 0.35 | 0.18 |
| 200 | 10.00 | 2.00 | 1.00 | 0.50 | 0.25 |
| 500 | 15.81 | 3.16 | 1.58 | 0.79 | 0.40 |
| 1,000 | 22.36 | 4.47 | 2.24 | 1.12 | 0.56 |
| 2,000 | 31.62 | 6.32 | 3.16 | 1.58 | 0.79 |
| 5,000 | 50.00 | 10.00 | 5.00 | 2.50 | 1.25 |

Table 2 shows the full widths of the ion signals (often referred to as ion peaks) at half maximum (FWHM), which are the maximum allowed for the stipulated mass resolutions. These peak widths are also expressed in nanoseconds.

The accuracy requirements discussed above can only be satisfied when good mass resolution is achieved. The mass resolution R is defined as the mass value m divided by the linear width Δm at half the signal height, where the linear width Δm has to be measured in the same mass units as the mass m ($R=m/\Delta m$). There is no strict relationship between the mass resolution and the resulting accuracy of the mass determination. However, it is true that a better resolution also results in a better mass accuracy for the same number of ions in any one ion peak. The ions which are available are combined in a narrower signal band, the signal is higher and the signal shows less noise in the vicinity of the signal peak.

As a very approximate rule of thumb, the position of the signal can be precisely fixed at approximately 1/20 of its width. This means that a resolution of approximately R=20,000 must be aimed at in order to achieve an accuracy of 5 ppm for the mass calculation. However, this only applies to solitary lines. For the peaks of a group of isotopes, this only applies when the isotope lines of the ion signal are relatively well resolved, i.e. when the valleys between the maxima are really well defined and if only one line is used for the mass determination. If the peaks of a group of isotopes overlap, then the desired mass accuracy cannot be achieved.

Since organic ions of higher molar masses show a large number of isotopes (see FIG. 1), if the isotopes are resolved, a special method for mass determination as described in DE 198 03 309 (corresponding to U.S. Pat. No. 6,188,064) can be applied. This method produces increased mass accuracies. The method, designated here as the "SNAP" method for the sake of simplicity, consists of integrating the well-known actual isotope structure complete into the measured signal group for the mass determination instead of using the ion signals of the isotope peaks on their own. The mass accuracy increases with the number of available peak flanks, since these determine the quality of the integration. With eight well characterized flanks, the mass accuracy can be improved by a good factor of two, providing the mass calibration curve is able to provide this accuracy. By using this method, a mass accuracy of 5 ppm can already be achieved with a mass resolution of approximately 1,000. (However, we must not lose sight of the fact that the accuracy striven for is 3 ppm or even 2 ppm.)

From Table 2, it can be seen that the signal widths are very narrow when the mass resolution aimed at is in the region of 20,000. The signal widths (always measured as the full widths at half peak height) are 0.3 to approximately 2.5 nanoseconds for masses of 100 to 5,000 atomic mass units. Even for a resolution of R=10,000, signal widths ranging from 0.7 to 5 nanoseconds are necessary.

In this type of mass spectrometer, secondary electron multipliers are used to measure the ion currents. These are in the form of multi-channel plates with channels ranging from 3 to 25 micrometers diameter arranged slightly diagonally to the plate surface to prevent the ions from simply passing through. Two channel plates are normally connected one behind the other with the channel angles offset to increase the amplification of the electron currents. The degree of amplification can be set to between $10^5$ and $10^7$. In other words, one ion is able to produce $10^5$ to $10^7$ secondary electrons which are captured by an electrode connected downstream. The detectors are of complex design (such as that shown in FIG. 5) in order not to produce any signal distortion—but the specialist will be familiar with the arrangements, so no further discussion about these detectors is necessary here. When used with a post amplifier, the system can in principle be adjusted so that a single ion will produce a signal which stands out significantly above the electronic noise.

However, the avalanche-like secondary electron multiplication taking place in each of the channels on the plate also causes the electron-current signal to spread. A signal of 1.1 nanoseconds width is produced from the impingement of a single ion, and this only by using the best pairs of channel plates currently available commercially. The signal widths of cheaper channel plates range from 1.4 to 2 nanoseconds. Significant progress in the future is not expected, since development in this technology is essentially exhausted.

So-called transient recorders with scanning rates up to 4 MHz can be used for scanning the amplified ion current. It is of interest to note here that this technology is also largely at a mature stage of development. While for other electronic components and systems the processing speeds have doubled approximately every 1.5 to a maximum of 3 years, in the area of transient recorders, there has been no increase in the scanning rate for about the last six years, in spite of the sharp competition between some of the companies—and no significant change is expected during the next few years either.

If the electron current curve from the channel plates is digitized at a rate of 4 GHz point by point by using a device such as a transient recorder containing an analog-to-digital converter, then the minimum signal width obtained for each ion is 1.1 nanoseconds when using the best equipment, irrespective of the mass of the ion. If the signal profiles of several ions are added together or if several ions of the same mass arrive simultaneously, then the signal widths will be even larger, since focusing errors in the mass spectrometer, non-compensated effects from the initial energy distributions of the ions before pulsing out and other effects will play a part. These effects will also give rise to additional signal smearing of the order of a nanosecond, which also depends on the mass of the ions in most cases. In particular, it must be borne in mind that different penetration depths of the ions into the channels of the multi-channel plates give rise to different trigger times for the electron avalanches. With an effective flight path of one meter, a scattering of penetration depths of just 10 micrometers gives rise to a time-of-flight scatter of plus/minus 5 ppm and, consequently, a mass scatter of plus/minus 10 ppm. These values are halved by doubling the flight path—this effect on the signal width, by the way, is the only one which (for a given scatter of penetration depths) can be improved by increasing the length of the flight path alone. Since, according to experience, all these contributions to the signal width add up pythagorically (i.e. forming the root of the sum of the squares of the widths), signal widths less than 1.1 nanoseconds certainly cannot be achieved and signal widths less than 1.5 nanoseconds can only be obtained with the very best spectrometers and detectors; in most cases, therefore, the real signal widths range from 2 to 5 nanoseconds.

However, these values are significantly higher than the values which are necessary for the desired resolution of R=20,000 (or even R=10,000). According to the rule of thumb mentioned above, therefore, the desired mass accuracy of 5 ppm cannot be achieved—at any rate, not over the whole mass range. In conclusion, it is not possible to simply digitize the electron currents with a transient recorder and add up the individual spectra because the resulting peak signal widths are not good enough. In practice, therefore, other methods are also used which should be briefly described here along with the prior art of the time-of-flight mass spectrometers.

FIG. 5 is a schematic diagram of the principle of a time-of-flight mass spectrometer with orthogonal ion injection. A beam of ions with different initial energies and flight directions enters the ion-guide system (4) through an aperture (1) in a vacuum chamber (2). A damping gas enters the ion-guide system simultaneously. In the gas, the ions are decelerated by collision on entry. Since a pseudo-potential for the ions is present in the ion-guide system and is at its lowest at the axis (5), the ions collect at the axis (5). At the axis (5), the ions spread out toward the end of the ion-guide system (4). The gas from the ion-guide system is pumped away by the vacuum pump (6) on the vacuum chamber (2).

At the end of the ion-guide system (4), there is a drawing lens system (7) which is integrated into the wall (8) between the vacuum chamber (2) for the ion-guide system (4) and the vacuum chamber (9) for the time-of-flight mass spectrometer. In this case, the drawing lens system (7) is made up of five apertured diaphragms and draws the ions from the ion-guide system (4) to form an ion beam of low phase volume which is focused into the pulser (12). The ion beam is injected in the x-direction into a pulser. Once the pulser has just been filled with passing ions of the preferred mass for analysis, a short voltage pulse ejects a broad package of ions perpendicular to the previous flight direction, and forms a broad ion beam which is reflected by the reflector (13) and measured by the ion detector (14, 15) at high time resolution. In the ion detector, the ion signal, which is amplified in a secondary electron multiplier in the form of a double, multi-channel plate (14), is transmitted to the 50Ω cone (15) by capacitance. The amplified signal is passed to an analog preamplifier via a 50Ω cable. The 50Ω cone is used to terminate the cable at the input end in order to prevent any signal reflection. Since these electrical signals are only a few nanoseconds wide, it is vitally important to make sure that the quality of their transmission is extremely high in order to avoid any further distortion. The signals of the preamplifier are then passed to the digitizing system.

As described above, in time-of-flight mass spectrometers with orthogonal ion injection, sections from the ion beam are injected periodically by a pulser into the drift region of the mass spectrometer. At the same time, initial ion distributions in terms of space and velocity are compensated for as much as possible. The ions are usually generated by electrospray outside the vacuum system of the mass spectrometer. Pulse rates, and therefore spectral scanning rates, of 10 to 30 kHz are used. The data in the tables above are based on a mass spectrometer with a pulse frequency of 20 kHz, thus allowing a time of flight of 50 microseconds for the heaviest ions. According to the prior art, the individual ion pulses, each of which produces one spectrum, only contain very few ions (although work on improving this is being carried out). It is particularly rare to find two or more ions in the mass signal for an ion species of one mass; normally an ion signal of one mass is generated by a few ions coming from a much larger number of spectral scans. (However, it must be noted that significant improvements are expected in the ion sources. These will produce ion currents which will be too large for the scanning methods described below to cope with.)

Because of the small number of ions in each pulse, time-to-digital converters (TDC) are used in all commercially available instruments of this type. If the electron current which comes from the multi-channel plates and is detected by an electrode exceeds a certain threshold, then the event is recorded. This event is recorded purely as a time value without any associated intensity. One ion alone will trigger this event. The time-to-digital converter cannot recognize the difference between an event triggered by a single ion and an event triggered by many ions arriving simultaneously. The time values are then used in a histogram of the events. This histogram is made up of many separate time intervals of equal size. For each time interval there exists a counter for the events which take place within this time interval. The histogram is normally generated in a section of the computer memory where a memory cell is provided for counting the events for each time interval. For example, a memory cell may be available as a counter for every 250 picoseconds. A spectrum over a maximum duration of 50 microseconds would then take up 200,000 memory cells, each for a time interval of 250 picoseconds. The events associated with the time values are summed up in these memory cells to give a histogram-type presentation of the time-of-flight spectrum.

By using a TDC, therefore, the times of the ascending flanks of the electrical signals are retained whether the electrical signal has been generated by a single ion or a cluster of several ions of the same mass and therefore the same time of flight. The width of the electron-avalanche signal does not broaden the peak width. For this reason, higher resolutions can be achieved than by using an ADC. However, there are serious disadvantages in using TDCs.

The first disadvantage of using time-to-digital converters is the limited measurement dynamics. If the ion beam which is injected into the time-of-flight mass spectrometer becomes so intense that several ions of the same mass in a single pulse are accelerated more often into the drift region of the time-of-flight mass spectrometer, the information concerning the number of these ions is lost. Although this can be corrected by a statistical calculation of the frequency of the individual events, this method of correction soon fails as the intensity of the beam increases.

The second disadvantage associated with time-to-digital converters is the dead time of the counter after the event has taken place. It is easy to see that, after one event has been triggered, the next event cannot be measured until the electron current of the multiplier drops below the trigger threshold again. The detector is therefore blind for the time of the width of the signal. This dead time increases when a second or even a third event occurs within the time period represented by the signal width since the width of the signal continues to increase and the electron current no longer drops below the trigger threshold. The second or third ion is not necessarily of the same mass, but can certainly be an ion which is one or two atomic mass units larger and therefore belongs to another isotope line. This behavior can be somewhat improved artificially by not using an absolute threshold but a threshold of the rate of rise, i.e. a threshold of the first derivative. However, this again only helps to a limited extent.

If the dead time affects the neighboring isotopic signals, this behavior of time-to-digital converters leads to a distortion of the signal intensities. The distortion increases with the intensity of the ion beam, since an increasing number of neighboring events are suppressed. The behavior is illustrated in FIGS. 1 and 3 (with associated text). FIG. 1 shows the calculated theoretical isotope frequency of quintuply charged insulin (monoisotopic molecular weight=5735.65 u) showing a signal group between m/z=1147 and m/z=1149.5 u on the mass scale (m=mass, z=the number of elementary charges of the ion). FIG. 3, on the other hand, shows a measured spectrum with frequency distortions using a TDC. The ratio of Peak 5 to Peak 2 should be 2:1 but is actually 1:1 because of the effect of the dead time.

However, if a multi-channel analog-to-digital converter with a rapid adding unit, such as the "averaging transient recorders" which are on the market, is used for the spectra instead of the time-to-digital converter and if the ion currents reproduced by the multi-channel plates and the post amplifier are simply added then, although the resolution is reduced, the correct isotope pattern is obtained. If the resolution is sufficient for using the SNAP method (for example, in the high mass range), then satisfactory mass accuracies are obtained. However, the resolution is frequently not sufficient, as can be seen by the isotope group of the quintuply charged insulin in FIG. 2 (with associated text). In this case, a 2 MHz transient recorder was used. FIG. 2 is thoroughly typical, since large molecular ions which have been generated by electrospray ionization always have so many charges that they show the isotope group with the highest intensity in the range between m/z=1,000 and m/z=2,000. Particularly in this m/z range, therefore, it is desirable to produce the highest resolution.

However, the time-of-flight mass spectrometer with orthogonal injection of a continuous ion beam is not the only problem area where the resolution is reduced by the detector. A very similar problem exists with the time-of-flight mass spectrometer with pulsed ionization by matrix-assisted laser desorption and ionisation (MALDI). In this case, basically only transient recorders with ADCs are used because, in most cases, the ion signal of an ionization pulse can represent many ions of the same mass. Typically, 50 to 500 or, in a few instruments, even a few thousand spectra are added. Also, with these MALDI time-of-flight mass spectrometers the peak width for the ion signals of ions of the same mass is often limited by the width of the electron avalanche in the multi-channel plate.

SUMMARY OF THE INVENTION

The basic idea of the invention is to use an analog-digital-converter (ADC) to digitize ion currents amplified by a detector and post amplifier, but not simply to add the individual time-of-flight spectra from measurement to measurement and so produce a poorly resolved sum spectrum; instead the idea is to subject each individual time-of-flight spectrum to a peak search algorithm and to prepare a composite time-of-flight/intensity histogram from the calculated times of flight of the ion peaks, where (unlike the situation when using TDCs) the calculated intensities of the peaks are added in the memory cells associated with the histogram. The time-of-flight/intensity histogram is further processed as a final composite time-of-flight spectrum (instead of the sum spectrum used hitherto) and the peaks are converted to masses. With this procedure, the peak width of the time-of-flight signals does not become part of the peaks in the composite histogram spectrum (as with histograms by TDCs) but the measured peak intensities are maintained so that the correct isotope distributions are measured even if higher ion currents exist which result in a large number of ions in a peak in a single spectrum.

Here, the calculated time of flight for the ion peak is defined as the result of time-of-flight calculations by the relevant peak search algorithm. The same applies to the calculated peak intensities. They too are the result of calculations of the respective peak search algorithm.

The width of the signal peaks in the time-of-flight/intensity histogram is now formed by the time-of-flight scatter alone and not by the time width of the electron avalanches in the multi-channel plates. The scatter in the times of flight values of the ions is caused entirely by defective focusing of the ions of same mass in the time-of-flight mass spectrometer, the uncorrected initial energy scatter, the scatter in the penetration depth of the ions in the multi-channel plate and the statistical peak distortions (noise) in the individual spectra. Most of these causes can be influenced by the developer, so it becomes possible to improve the resolving power even further.

It is essential that the algorithms for finding the peaks are very simple because they have to keep up with the speed of digitization in order avoid causing data jams. It is particularly beneficial for the peak search to be synchronized with the data acquisition. At digitization rates of 2 or even 4 GHz, this is only possible with extremely fast computers or very special computing networks (such as very fast "field programmable gate arrays" (FPGAs) or networks of fast central computing units (CPUs)) which allow parallel data processing in order to keep in step with the data acquisition rate.

Another basic idea of the invention is therefore to use a difference calculation for calculating the first derivative for the peak search, where the zero crossover of successive differences indicates the peak maximum. The intensity is calculated as the sum over two or more measurement points; in the limiting case, the measurement value of the maximum itself is sufficient. The entire calculation procedure can be carried out networked in parallel in the computing network. For more accurate calculations, smoothed differences can be calculated from a total of 4 or more measurement values in each case, while for the intensity, sums of 4 or more measurements can be calculated. The pairs of flight time and intensity values can be transferred to other computers which prepare the histogram. The histogram computer may be inside or even outside the transient recorder. These new transient recorders are much simpler than recorders according to the state of the art since they no longer have to cope with the difficult task of summing all the spectra in real time.

Additional threshold tests for the intensity sum or for the maximum of the derivative shortly before the zero crossover can prevent noise peaks from being transferred to the histogram.

With transient recorders possessing independent memory banks for the storage of the individual spectra, slightly different procedures may be performed: If the noise level is constant throughout the spectrum, a combination of threshold search for a peak with a more thoroughful claculation of peak flight time and peak intensity may be applied. This algorithm requires independent banks of fast memory and favorably at least two computer processing units with access to the memory. During the evaluation of one spectrum, the next spectrum is stored in another set of memory banks.

A mixed procedure adds first a smaller number of spectra, say 20 to 50 spectra, to obtain sum spectra and applies then the peak search algorithm to these sum spectra. The flight-time/intensity histogram is then constructed from the resulting pairs of flight times and intensities from about 50 to 1000 sum spectra. This also requires a transient recorder with a number of independent memory banks.

BRIEF DESCRIPTION OF THE DRAWINGS

FIG. 1 shows the calculated isotope distribution assuming overlapping Gauss curves, the widths being selected to give a resolution R=8,200.

FIG. 2 shows a measurement curve produced by using a transient recorder with an analog-to-digital converter with a 2 GHz data-acquisition rate. The mass resolution amounts roughly to R=6,000, which is insufficient for an accurate mass determination. 10,000 individual spectra were summed.

FIG. 3 shows a spectrum recorded using a TDC, showing a distorted frequency distribution of the isotope lines.

FIG. 4 shows a spectrum which has been acquired using the method according to the invention, demonstrating the correct frequency distribution. The Figure shows higher noise than FIG. 3, because much less individual spectra were acquired and processed.

DETAILED DESCRIPTION

Figure 5:
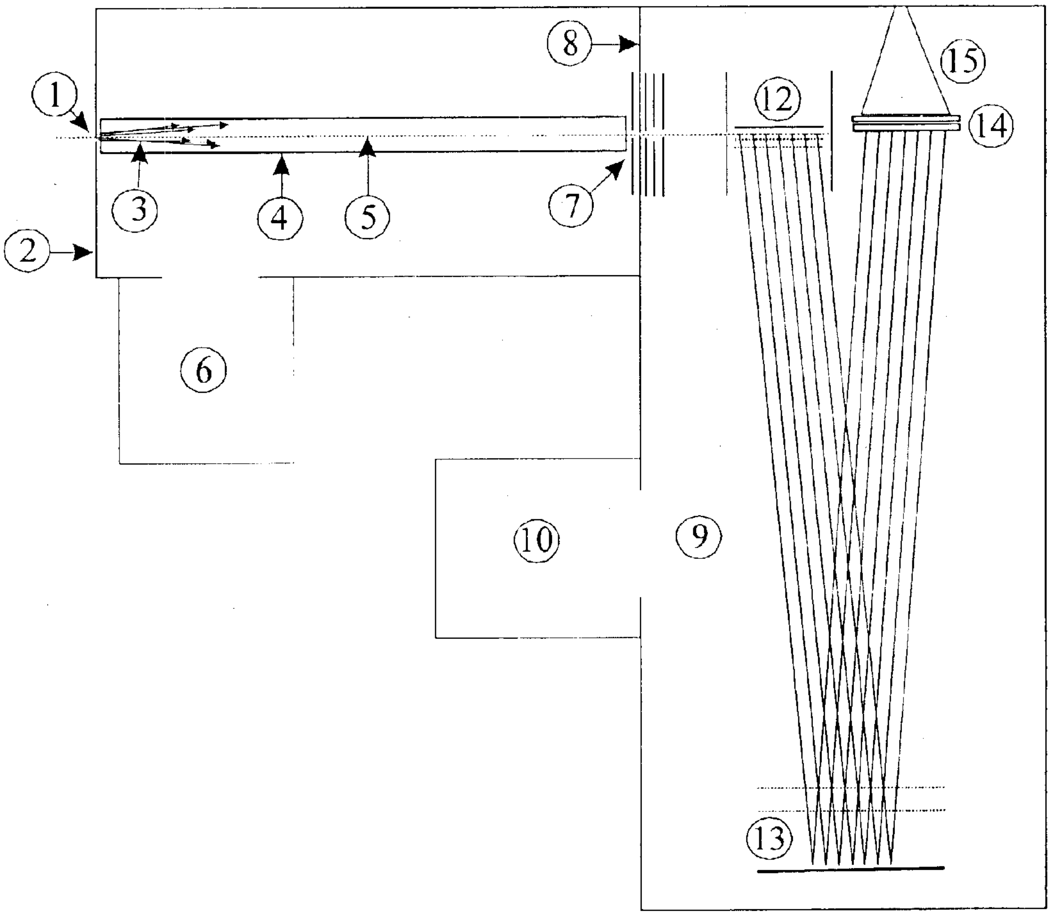
FIG. 5 is a schematic diagram of the principle of a time-of-flight mass spectrometer with orthogonal ion injection, preferredly used for the application of this invention.

First, a description will be given of an embodiment of the method and the equipment which is aimed at achieving the maximum possible resolution. In a time-of-flight mass spectrometer with orthogonal ion injection, as shown in FIG. 5, a pair of high-quality, multi-channel plates is used with a 1.1 nanosecond wide electron avalanche and a transient recorder operating at a digitization rate of 4 GHz for measuring the electron-multiplied ion current. This transient recorder has a special computing network. This computing network examines the individual time-of-flight spectra in real time for the presence of ion peaks, calculates their time of flight and intensity and makes these value pairs available for addition to the intervals of a time-of-flight/intensity histogram. The histogram is realized by means of memory cells in a section of the memory—a memory cell each for each time interval in the histogram. In this example, the time intervals of the histogram are just as long as the clock times of the transient recorder and correspond to 250 picoseconds in each case. Since the maximum spectral scanning time is 50 microseconds, in order to maintain a spectrum scan rate of 20 kHz, the memory contains 200,000 memory cells for storing the histogram. The histogram can be prepared in a computer which may even be separated from the transient recorder, since relatively little data per spectrum are transferred from the transient recorder to the histogram computer.

Experiments have shown that, with the calculation method detailed below for calculating the time of flight and intensity, obtaining an optimum result requires as many measurement values from the value sequence to be applied as are needed so that the values used for each calculation of the derivative difference and the sum of intensities will cover approximately 80% of the width of the signal peak measured at half the maximum height. Therefore, for a peak width of 1.1 nanoseconds, the optimum number of values to use for a 4 GHz scan is four. Consequently, the following description is adapted wholly to an algorithm using four measurement values.

The ADCs used in the transient recorders have conversion widths of eight bits and can therefore deliver values ranging from 0 to 255 counts. Presuming that the amplifications by channel plates and preamplifiers are adjusted so that, for reliable recognition, a single ion supplies a value of five counts, then the signal begins to be saturated with the arrival of 50 ions simultaneously and will lead to a false intensity when the limit is exceeded.

The ion peaks for which the times of flight and intensities have to be determined, may be generated either by individual ions or by clusters of ions of the same mass with up to approx. 50 ions simultaneously. All signal peaks which are generated by a single ion alone have a width of 1.1 nanoseconds, irrespective of the mass of the ions. For further description it is now assumed that, because of the outstanding standard of development of the time-of-flight mass spectrometer and because of the outstanding level of cooling of the injected ions, the contributions from erroneous focusing and non-compensated initial energy scatter are very small, so that they have no significant effect on the widening of the ion-signals.

The algorithm should calculate both the position, i.e the time of flight, and the intensity of the peak. The position is best found by a smoothed calculation of the first derivative, where the zero crossover with successively calculated derivative values indicates a maximum (or minimum) value in each case. The direction of the zero crossover indicates whether it is a maximum or minimum. The intensity is calculated by a summation via the main component of the peak.

Four intensity values w are used in each case for the smoothed calculation of the first derivative at position n in the value sequence w(n) of the time-of-flight spectrum:

$$a(n)=w(n-2)+w(n-1)-w(n)-w(n+1) \quad (1)$$

If there is a transition from negative to positive values a while the derivatives a are being calculated, then there is a peak maximum. The intensity sum:

$$s(n)=w(n-2)+w(n-1)+w(n)+w(n+1) \quad (2)$$

is now checked to find out whether it exceeds a specified threshold and, in the positive case, it is added to the cell n of the histogram. The calculations for a and s can be further simplified by calculating the intermediate sums d and e as follows:

$$d=w(n-2)+w(n-1) \quad (3)$$

$$e=w(n)+w(n+1) \quad (4)$$

$$a(n)=d-e \quad (5)$$

$$s(n)=d+e \quad (6)$$

It is now only necessary to carry out four additions or subtractions. Apart from that, the indexed numbers of the value sequence in the spectrum need only be accessed once in each case.

Very fast field programmable gate arrays (FPGAs) or specially developed modules can be used as the computing networks. The calculations for successive measurement values can largely be performed simultaneously and while further measurement values are being recorded; the calculations are then complete only a few nanoseconds after individual spectrum scanning has finished. The FPGAs can be run at a slower clock time than the ADCs, but if they are, the number of parallel calculation strings will have to be increased. It will then no longer be necessary to store the original measurement values (rapid storage can be very problematic and can only be performed in parallel memory blocks). The list of the time-of-flight and intensity value pairs can be transferred to another computer which prepares the histogram. The setup of a transient recorder such as this can be significantly simpler than a conventional recorder which has to sum and store the entire time-of-flight spectrum. The list of time-of-flight and intensity value pairs for the peaks generally involves far less than 1,000 entries per spectrum, which is a lot less than 1% of the measurement values for a single time-of-flight spectrum—the preparation of a spectral histogram is therefore no longer time-critical.

Shortly after the desired number of individual spectra has been completed, the time-of-flight/intensity histogram is available for further processing. Further processing consists, in particular, of converting the times of flight to measurement values, where the SNAP algorithm mentioned above (DE 198 03 309; U.S. Pat. No. 6,188,064) plays a special role, since this produces an increased mass accuracy because all the isotope peaks are used simultaneously. The method used for converting the times of flight into masses is known in principle and needs no further explanation here.

As the value pairs are added to the histogram, not every tiny signal has to be transferred because, in most cases, these will be noise peaks. The aim should rather be to make sure that only real ions are represented in the histogram and not accidental noise peaks. The suppression can most easily be achieved by checking the calculated intensity values—only those intensity values which exceed a specified threshold are passed on to be used in the histogram.

With a background which is not constant over the spectrum but shows variations in intensity, a threshold test such as this is highly problematic. At one end of the spectrum, noise peaks are still allowed while at the other end, weak ion signals are lost. In this case, which occurs especially with highly sensitive transient recorders, another type of threshold test must therefore be used: instead of subjecting the intensity value s(n) to a threshold test, the value of the a(n−2) derivative is subjected to the test shortly before reaching the zero crossover. This test avoids the known difficulties associated with a threshold test when used on a variable background.

This embodiment can be varied in many different ways. For example, an even simpler algorithm can be used for peak-maximum recognition which consists of obtaining the derivative by calculating the difference between just two measurement values at a time and therefore determining the zero crossover. By using certain types of computer, it is also easy to establish when a sequence of values no longer increases—which is also how a maximum is determined.

Other embodiments of the computer algorithm are also possible. For example, if the minimum peak width in the spectrum is wider than four scanning values (for example, when an inferior but significantly cheaper pair of multi-channel plates is used), then Equations (1) and (2) must be adapted accordingly:

$$a(n)=w(n-b)+\ldots+w(n-1)-w(n)-\ldots-w(n+b-1) \quad (7)$$

$$s(n)=w(n-b)+\ldots+w(n-1)-w(n)-\ldots-w(n+b-1) \quad (8)$$

where b is a number corresponding to the number of values above the half width of the peak.

The values a for the derivative and the values s for the sum of intensities can be calculated for each value separately in a similar way to the method described above. However, it is much simpler to calculate them as sequential values in the computer network, additions no longer being necessary. The following relationships are used for this purpose:

$$a(n+1)=a(n)-w(n-b)+w(n)+w(n)-w(n-b) \text{ and} \quad (9)$$

$$s(n+1)=s(n)-w(n-b)+w(n+b) \quad (10)$$

The computer network must therefore carry out six additions (or subtractions) and two comparisons for each newly acquired value. However, the disadvantage is that each calculation requires the calculation for the previous measurement value be finished before proceeding with the next. This demands extremely fast computers.

The scanning rate intervals need not, however, coincide with the time-of-flight intervals of the histogram. So, for example, the histogram can have twice the number of time-of-flight intervals or, if necessary, even three or four times the number. In that case, a more accurate determination of the time of flight from the measurement values will of course be necessary. This more accurate determination can be achieved by establishing whether the zero crossover is nearer the previous measurement value or the following measurement value. For an even more accurate determination, an interpolation can be carried out between the two derived values either side of the zero crossover in order to locate the zero crossover more accurately.

For cheaper instruments or instruments which are compelled to process the spectrum extremely fast, compression of the histogram may be considered, in which case, two or more time-of-flight intervals are assembled in one memory location.

Figure 1:
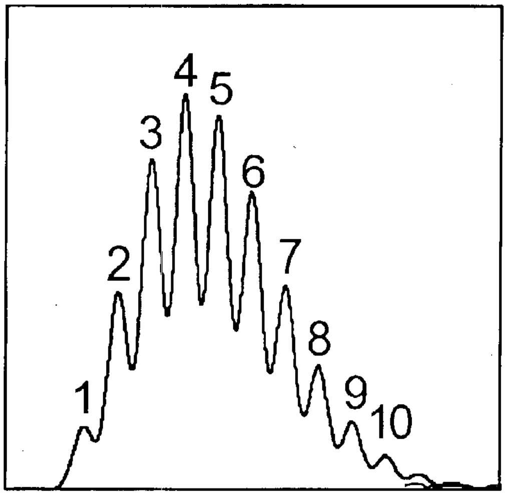
FIGS. 1 to 4 depict the spectrum of the fivefold charged isotope group of insulin, the molecular weight of which is about 5,700 atomic mass units. The peak group appears on the mass scale at approximately m/z=1,147.
Figure 3:
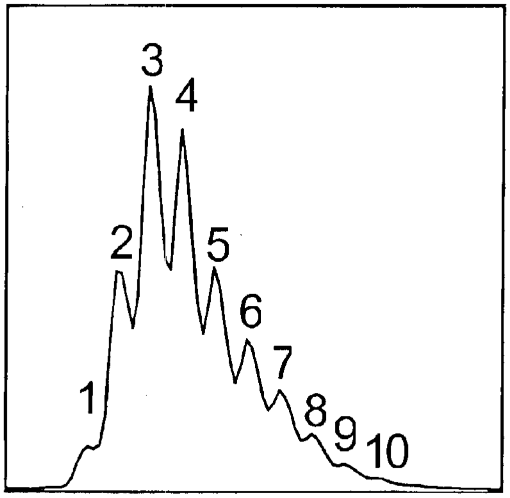
Figure 4:
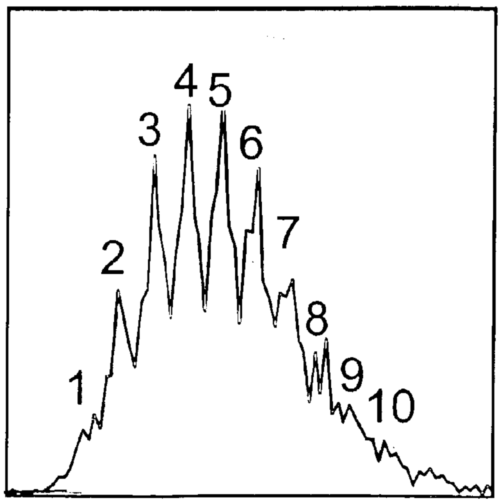

The method according to the invention for preparing a time-of-flight histogram from ADC values has the major advantage of achieving a resolution like that produced by a TDC, as can be seen by comparing FIGS. 3 and 4. However, in comparison with the method using a TDC, the method according to the invention has the immense advantage of intensity accuracy, which allows the use of very precise mass calculations. The intensity accuracy can be clearly seen by comparing FIGS. 1, 3 and 4.

Figure 2:
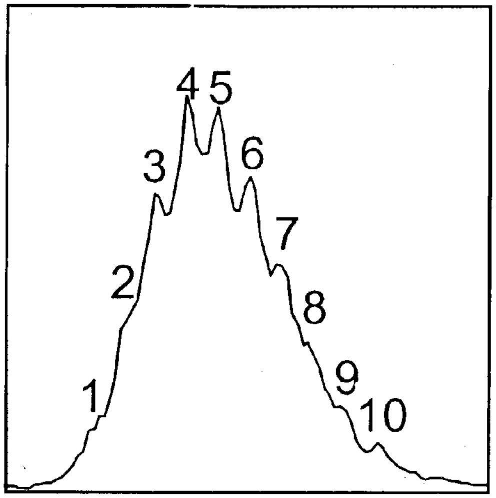

FIG. 3 shows a spectrum recorded using a TDC. The resolution is clearly better than that of the ADC scan (FIG. 2) but, because of the dead time effect, the frequency distribution of the isotope lines does not agree with the distribution calculated according to theory in FIG. 1. The fifth isotope line is only about the size of the second line, whereas it should actually be twice as big. The events from 250,000 individual spectral scans were added to exclude errors caused by noise. This measurement curve is not suitable for use with the SNAP method for calculating the mass with increased mass accuracy because the SNAP method involves integrating the theoretical isotope pattern (shown in FIG. 1), which must fit accordingly.

FIG. 4 shows a measurement curve which has been acquired using the method according to the invention. An ADC with a clock time of 2 MHz was used but an averaged time of flight for the ions of the associated ion signal and an averaged intensity were determined from each individual spectrum. The time-of-flight histogram shown was prepared from the times of flight and intensities determined. In this case, only 10,000 individual spectra were acquired, i.e. 25 times less than in FIG. 3. The measurement signal therefore shows more noise but corresponds more closely to the measurement conditions which can be achieved in practice. This measurement curve is outstanding for determining the masses, particularly when applying the SNAP method, since the relative abundance of the isotopes appear correctly, as can be seen by comparing the results in FIG. 1. It should be pointed out that the residual width of the signals is due to non-compensated initial energy scatter, focusing errors and penetration depth scatter in the channel plates, and can therefore be improved by developing the instrument further.

There is, however, another advantage of the invention which cannot be overestimated: the advantage of much greater measurement dynamics. With the TDC method, manufacturers recommend that ion currents used should be no higher than approximately the equivalent of one ion per three spectral cycles in one ion peak. This is easy to understand since, if one ion appears in an ion peak in every second spectral scan, then we will see just 1,000 ions in 2,000 spectral scans (corresponding to a measurement period of 1/10 second for the sum spectrum), i.e. 50%. In reality, however, 2,000 ions have arrived. Of the 50% of the events which apparently contain one ion, 25% of the events actually contain two or more ions, 12.5% of the events contain three or more ions and 6.25% of the events contain four or more ions. In the sum, there are 100% or 2,000 ions instead of the supposed 1,000 ions. Saturation therefore sets in very early on, which has led to the recommendation above. The saturation in our scanning period of 1/10 second leads to a recommended upper limit of about 700 ions. If it is also assumed that approximately 5 ions yield a just about reliably visible ion line (i.e. not simply a scatter ion), then the dynamic measurement range, which is defined as the highest undistorted measurement value divided by the value at the measurement threshold, has a value of just about 140.

With an ADC, we can measure approximately 50 ions in one measurement interval without distortion (see the explanations above). With 2,000 individual spectra in 1/10 second, this is equivalent to 100,000 ions. If again we take the same five ions as the detection limit, then the dynamic measurement range for the method according to the invention is 20,000 which is approximately a factor of 140 higher than when a TDC is used.

Here, a scanning time of 1/10 second was chosen for the spectra in each case. This did not happen by chance: this type of mass spectrometer has a much higher time resolution than other mass spectrometers. It is therefore outstandingly suitable for use with very fast chromatographic or electrophoretic methods. The keywords here are nano LC and micro-capillary electrophoresis. Up to now, these future-oriented separation techniques could hardly be used, since they demand both a fast spectral rate (which is already available with TDCs) and high measurement dynamics (which is not available with TDCs). The new method according to the invention represents the start of a new era.

There are still other embodiments of this invention, using transient recorders similar to those of the state of the art, possessing large memory banks for the storage of the individual spectra.

At first, the individual spectra are stored in an empty memory bank each. If the noise level is constant throughout the spectrum, a combination of threshold search for a peak with a more thoroughful calculation of peak flight time and peak intensity may be applied at a time where the next memory bank is filled with the next spectrum. This algorithm is faster and easier to install but favorably requires two computing processing units with access to the memory. The results of the peak search are transferred to the histogram computer, and the memory bank is ready to take the next spectrum. This procedure, in general is more difficult as it seems, because an individual spectrum usually is already stored in four different memory banks because the access time of a memory bank does not allow to store data in rates of 250 picoseconds.

Another procedure adds first a smaller number of spectra, say 20 to 50 spectra, to obtain sum spectra and applies then the peak search algorithm to these sum spectra. If the spectra are spread over several memeory banks, the sum spectrum first has to be assembled in a single memory bank. Nevertheless, this procedure is faster than a real-time peak search in every individual spectrum. The flight-time/intensity histogram is then constructed from the resulting pairs of flight times and intensities from about 50 to 1000 such sum spectra. This also requires a transient recorder with large memory banks. The number of individual spectra added should be smaller than 1/20 of the number required spectra in total for the histogram, otherwise the histogram will not appear to be smooth enough for further processing.

What is claimed is:

1. Method for acquiring a high resolution mass spectrum from repeatedly measured time-of-flight spectra in a time-of-flight mass spectrometer, comprising the following steps:

(a) acquiring a plurality of time-of-flight spectra by continuously digitizing ion currents of an ion detector with an analog-to-digital converter, (b) obtaining a value for the time of flight and the intensity of each ion current peak maximum for each time-of-flight spectrum by a fast searching routine, (c) adding up the intensity value of each ion current peak maximum into a time-of-flight/intensity histogram at the position of its associated time of flight value, and (d) processing the time-of-flight/intensity histogram into the high resolution mass spectrum.

2. Method according to claim 1 wherein, between step (a) and step (b), a number of time-of-flight spectra are added, the number being smaller than 1/20 of the number of time-of-flight spectra acquired in total for the time-of-flight/intensity histogram.

3. Method according to claim 1 wherein the time-of-flight/intensity histogram is prepared in a digital memory, where individual memory cells of the digital memory are assigned to time-of-flight intervals of the time-of-flight/intensity histogram and the associated intensity values are totaled up in the memory cells of the time-of-flight intervals.

4. Method according to claim 3 wherein the duration of the time-of-flight intervals of the time-of-flight/intensity histogram is as large as the inverse of the scanning rate of the analog-to-digital converter.

5. Method according to claim 3 wherein the duration of the time-of-flight intervals of the time-of-flight/intensity histogram is a simple fraction or an integral number multiple of the inverse of the scanning rate of the analog-to-digital converter.

6. Method according to claim 1 wherein the fast searching routine retrieves the ion current peak maxima and calculates the times of flight of the ion current peak maxima by numerically determining zero crossovers from positive to negative values of the first derivative of the time-of-flight spectrum.

7. Method according to claim 6 wherein more than two successive digitized ion current values of the time-of-flight spectrum are used for calculating the first derivative.

8. Method according to claim 1 wherein the fast searching routine calculates the intensity value of a single ion peak maximum by a finite series of ion current values around the ion peak maximum.

9. Method according to claim 1 wherein only the intensity values of ion peak maxima which exceed a threshold value are added up in the time-of-flight/intensity histogram.

10. Method according to claim 1 wherein only the intensity values of ion peak maxima for which a first derivative exceeds a threshold level are added up in the time-of-flight/intensity for the construction of the histogram.

11. Transient recorder for acquiring large sequences of time-of-flight spectra which are processed into a high resolution mass spectrum, comprising:

an analog-to-digital converter that continuously digitizes ion currents from an ion detector to generate time-of-flight spectra, a computer or computing network that processes the digitized ion current values using a peak-search routine and calculates the values for times of flight and intensities of ion current peak maxima in the time-of-flight spectra, and data storage device that adds up the intensity values of the ion current peak maxima having equal times of flight and stores the sums of ion current peak maxima of different times of flight at storage locations related to the time of flight values generating a time-of-flight/intensity histogram.

12. Transient recorder according to claim 11 wherein the computer or computing network a number of time-of-flight spectra before the peak search routine is started, the number of added time-of-flight spectra being smaller than 1/20 of the number of time-of-flight spectra acquired in total for the time-of-flight/intensity histogram.

13. Transient recorder according to claim 11 wherein the peak-search routine:

a) calculates the first derivative of the time-of-flight spectrum;

b) determines zero crossovers from positive to negative values of the first derivative to retrieve the ion current peak maxima; and c) calculates the intensity and the time of flight values of the ion current peak maxima from digitized values of the time-of-flight spectrum around the ion current peak maxima.

14. Transient recorder according to claim 11 wherein the intensity values of the ion current peak maxima are checked, whether they exceed a threshold value and thusly are accepted for being included in the time-of-flight/intensity histogram.

15. Transient recorder according to claim 11 wherein the values of the first derivative shortly before reaching the ion current peak maxima are checked, whether they exceed a threshold level and thusly the ion peak maxima are accepted for being included in the time-of-flight/intensity histogram.

* * * * *